(12) United States Patent
Van Duyn

(10) Patent No.: US 8,440,047 B2
(45) Date of Patent: May 14, 2013

(54) METHOD FOR PRODUCING A STRETCH RESISTANT BELT

(75) Inventor: Ryan Van Duyn, Lancaster, PA (US)

(73) Assignee: Fenner U.S., Inc., Manheim, PA (US)

( * ) Notice: Subject to any disclaimer, the term of this patent is extended or adjusted under 35 U.S.C. 154(b) by 1123 days.

(21) Appl. No.: 11/752,561

(22) Filed: May 23, 2007

(65) Prior Publication Data

US 2008/0289745 A1 Nov. 27, 2008

(51) Int. Cl.
*B32B 37/00* (2006.01)
*B29C 65/00* (2006.01)

(52) U.S. Cl.
USPC ............... 156/308.2; 156/137; 156/244.23; 156/304.6; 156/308.4

(58) Field of Classification Search ............ 442/118, 442/164, 88, 92, 94, 98; 427/255.24, 539; 156/137, 308.2, 139, 140, 244.11, 244.23, 156/304.1, 304.6, 308.4, 309.6; 474/260, 474/263; 198/844.1, 846, 847
See application file for complete search history.

(56) References Cited

U.S. PATENT DOCUMENTS

| | | | |
|---|---|---|---|
| 2,811,468 A | 10/1957 | Joffre | |
| 2,829,070 A | 4/1958 | Osborn | |
| 3,740,256 A | 6/1973 | Manion et al. | |
| 3,940,520 A | 2/1976 | Dixon et al. | |
| 3,988,491 A | 10/1976 | Dixon et al. | |
| 4,009,304 A | 2/1977 | Dixon et al. | |
| 4,020,223 A | 4/1977 | Dixon et al. | |
| 4,619,854 A * | 10/1986 | Penttinen | 428/99 |
| 4,752,282 A | 6/1988 | Habegger | |
| 4,764,405 A | 8/1988 | Bauman et al. | |
| 4,767,389 A | 8/1988 | Habegger et al. | |
| 4,771,110 A | 9/1988 | Bauman et al. | |
| 4,800,053 A | 1/1989 | Bauman et al. | |
| 4,833,205 A | 5/1989 | Bauman et al. | |
| 4,880,879 A | 11/1989 | Bauman | |
| 4,972,030 A | 11/1990 | Bauman | |
| 5,360,379 A * | 11/1994 | Carelli et al. | 474/260 |
| 5,382,635 A | 1/1995 | McInnis et al. | |
| 5,506,283 A | 4/1996 | McInnis et al. | |
| 5,564,558 A | 10/1996 | Hampton et al. | |

(Continued)

FOREIGN PATENT DOCUMENTS

| | | |
|---|---|---|
| GB | 1501954 | 2/1978 |
| GB | 2106031 | 4/1983 |
| JP | 04-269526 | 9/1992 |
| JP | 06-300085 | 10/1994 |
| JP | 09315541 A * | 12/1997 |
| JP | 10-063029 | 3/1998 |
| JP | 2004-131880 | 4/2004 |

OTHER PUBLICATIONS

Supplementary European Search Report issued in European Application No. 08769615.9 on Jun. 28, 2011.

*Primary Examiner* — John Goff
(74) *Attorney, Agent, or Firm* — Stephen H. Eland; Dann, Dorfman, Herrell & Skillman

(57) ABSTRACT

A belt having stretch reduction features is provided, along with a method for producing a belt having reduced stretch characteristics. The belt is formed of a jacket and a stretch reduction element. The stretch reduction element is formed of a material having a greater modulus of elasticity than the jacket. Additionally, the stretch reduction element is formed by bathing the stretch reduction element to a reactive fluid in an oxidizing atmosphere.

19 Claims, 2 Drawing Sheets

U.S. PATENT DOCUMENTS

| | | |
|---|---|---|
| 5,685,417 A | 11/1997 | Hasegawa et al. |
| 5,693,714 A | 12/1997 | Bauman et al. |
| 5,969,053 A | 10/1999 | Bauman et al. |
| 6,062,379 A | 5/2000 | Geib et al. |
| 6,441,128 B1 | 8/2002 | Bauman et al. |
| 6,962,885 B1 | 11/2005 | Best |
| 7,241,354 B2 | 7/2007 | Fatato et al. |
| 2004/0121677 A1* | 6/2004 | Jahn et al. ............ 442/82 |

* cited by examiner

METHOD FOR PRODUCING A STRETCH RESISTANT BELT

FIELD OF THE INVENTION

The present invention relates to belts and in particular to belts for conveying items or for transmitting power. More specifically, the present invention relates to belts formed of a first material encasing an elongated element designed to reduce the stretching of the belt.

BACKGROUND OF THE INVENTION

Continuous belts are commonly used for conveying various elements. One common type of belt is a continuous belt that is extruded. Frequently, such belts are extruded from flexible materials, such as thermoplastic materials. One shortcoming of such belts is that the belts have a tendency to stretch during use. As the belt stretches, it tends to slip, thereby reducing the driving force of the conveyor. Further, the weight of the item to be conveyed is related to the tension in the belt. Specifically, as the weight increases, the tension in the belt needs to be increased to minimize slippage between the belt and the drive elements. The increased tension in the belt increases the tendency of the belt to stretch, which in turn increases the likelihood of the belt slipping.

Over the years a number of attempts have been made to overcome the problem of belt stretch. The primary solution has been to embed an item in the belt that has a relatively high tensile strength and resistance to stretching. For instance, polyester fibers are commonly formed in conveyor belts. The polyester fibers are less likely to stretch, and therefore the resulting belt has less likelihood of stretching than the belt without the fibers.

Although the fibers in the belt improve the stretch-resistance of the belt, the tendency of the belt to stretch has still remained a problem. Since the belt is typically formed from a length of material, the fibers are not continuous loops. In other words, along the length of the belt, the fibers are continuous. However, at the point where the ends of the belt are connected to one another, the fibers may be next to one another, but they are not continuous. Therefore, the weak point in a belt seems to be the point at which the ends are connected. For this reason, the focus of many attempts to reduce the problem of belt stretch have focused on manipulating the fibers at the point of connection, resulting in the development of complicated techniques for connecting the ends of the belts. Although many of these techniques have improved the problem of belt stretching, there still exists a need for providing a belt having a reduced tendency to stretch. In particular there is a need for a belt that resists stretch and is economical to produce.

SUMMARY OF THE INVENTION

In light of the foregoing, the present invention provides a belt that is economical to produce that is stretch-resistant. In particular the present invention provides a method for producing such a belt.

According to one aspect, the present invention provides a method for producing a stretch-resistant conveyor belt. According to the method, an elongated stretch reduction element is provided. The stretch reduction element is exposed to a reactive fluid in an oxidizing atmosphere. Jacket material is formed into a belt jacket around the stretch reduction material to form a length of material. The ends of the belt are then connected to form a continuous loop.

According to another aspect of the invention, a stretch resistant belt is provided. The belt comprises an outer jacket formed of a flexible material. The belt further includes a stretch resistant element formed of one or more fibers that have been exposed to a reactive fluid in an oxidizing atmosphere. The fibers are combined with the jacket to form a length of belt material. The ends of the belt are connected to form a continuous loop.

BRIEF DESCRIPTION OF THE DRAWINGS

The foregoing summary and the following detailed description of the preferred embodiments of the present invention will be best understood when read in conjunction with the appended drawings, in which.

DETAILED DESCRIPTION OF THE INVENTION

Referring now to the figures, wherein like elements are numbered alike throughout, a belt is designated 10. The belt is a continuous loop having an outer jacket 15 and a stretch reduction element 20. The stretch reduction element is embedded within the jacket 15.

Figure 1:
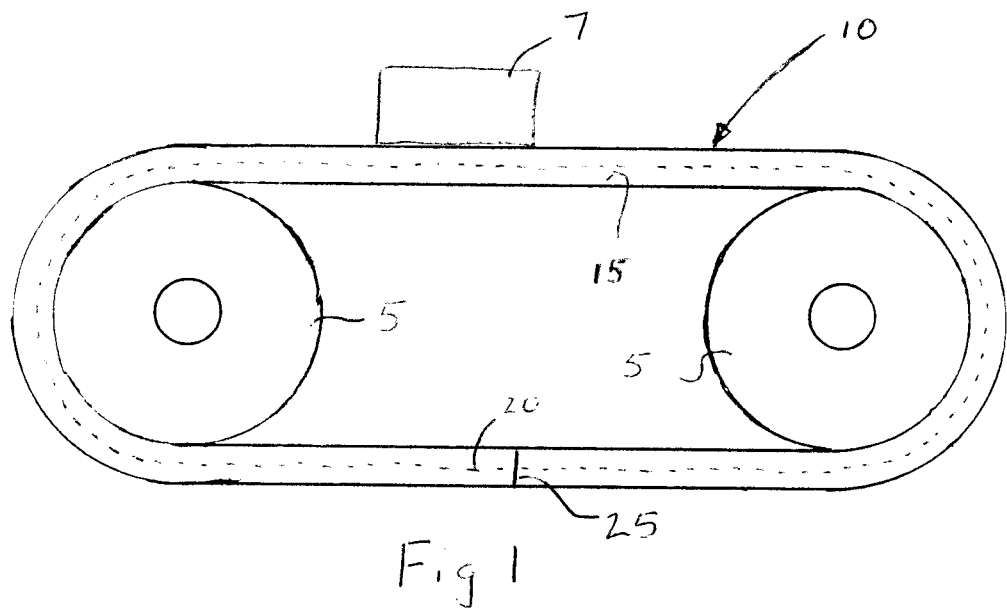
FIG. 1 is a side view of a belt according to the present invention.

The belt 10 may be utilized in a variety of applications, including power transmission and material handling. Referring to FIG. 1, the belt is illustrated in an exemplary application. Specifically, the belt 10 is entrained between a pair of pulleys 5. At least one of the pulleys 5 is a driven pulley, which drives the belt 10. An article 7 rests on the upper run of the belt 10, so that the belt displaces the article in the direction that the upper run is driven.

The belt may be configured in a variety of shapes and profiles. In the present instance, the belt has a generally circular cross-section. Additionally, in the present instance the belt is substantially solid.

The jacket 15 may be formed from a variety of materials depending on the application for the belt 10. For instance, the jacket may be formed from one or more thermoplastic materials, such as urethane. Exemplary thermoplastic materials are polyurethane, such as Texin and Elastollan, or polyether block amide, such as Pebax, or polyester elastomer, such as Hytrel.

Figure 2:
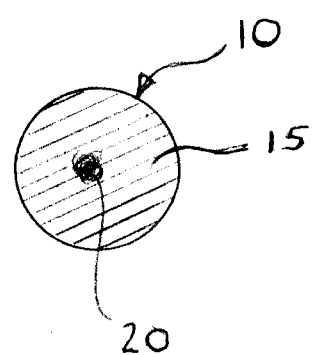
FIG. 2 is a cross-section view of the belt illustrated in FIG. 1.

The jacket 15 may be formed of a homogeneous material, as it is illustrated in FIG. 2. However, in certain applications, it may be desirable to utilize a layered jacket formed of several materials.

As shown in FIG. 2, the belt 10 includes an element 20 for impeding the stretching of the belt during operation of the belt. This element 20 is referred to as the stretch reduction element, and it is formed of one or more materials having properties that differ from the properties of the jacket 15. For instance, the stretch reduction element has a modulus of elasticity that is greater than the modulus of elasticity of the jacket. Similarly, the stretch reduction element 20 is formed of a material having a tensile strength that is greater than the tensile strength of the jacket material.

The stretch reduction element 20 may be formed from one or more materials depending on the application for the belt. Several exemplary materials are polyester, nylon, aromatic polyester, and aromatic polyamide. Further, the stretch reduction element 20 can be configured in various forms, such as a plurality of strands or woven fibers. In the present instance, the stretch reduction element is formed of material in the form of fibers or fabric that has been subjected to a reactive fluid in an oxidizing atmosphere to alter the surface of the material. The details of exemplary materials are provided further below in the description of the method for producing the belt.

The stretch reduction element 20 may be oriented relative to the jacket in a variety of configurations. In one configuration, the stretch reduction element is embedded within the jacket so that the jacket surrounds the stretch reduction element. Additionally, the stretch reduction element is oriented such that it extends substantially the entire length of the belt. Further, in the present instance, the stretch reduction element is substantially parallel with the central axis of the jacket, along substantially the entire length of the belt.

The ends of the belt 10 are connected to form a continuous loop, as illustrated in FIG. 1. The ends of the belt may be connected in a variety of ways, however, in the present instance, the ends are welded so that a weld joint 25 connects the ends together.

Method of Production

The method of producing the belt includes several steps. The first step includes providing the materials for the jacket and the stretch reduction element. The second step includes interconnecting the jacket and the stretch reduction element to produce a length of belt; and the third step includes the step of connecting the ends of the length of belt to provide a continuous loop. Each of the steps will be described in greater detail below.

As discussed previously, in the present instance, the belt is a two part belt, having a homogeneous jacket 15 wrapped around a stretch reducing element 20. The jacket material is selected to provide the desired characteristics for the outer surface of the belt and the desired wear characteristics of the belt. Because the application may vary widely, a number of jacket materials are acceptable candidates for the belt. Since it is desirable to provide the ability to weld segments of the belt together, it is desirable to select a jacket that allows two separate segments to be heated and melted together. Accordingly, the jacket material may be selected from among the group of thermoplastic materials and rubber materials. For instance, in the present instance, the jacket material is selected from among a group of thermoplastics including Texin, Elastollan, Pebax and Hytrel. However, it may be desirable to produce the belt from an alternate material that may be joined chemically, such as by solvent or otherwise. Accordingly, the jacket material is not limited to being a thermoplastic.

The jacket material is selected to meet various performance characteristics of the application for the belt. Accordingly, the jacket material may be selected to achieve various characteristics, such as abrasion resistance, coefficient of friction or deformability. Ordinarily, the characteristics of the jacket are selected without significant regard for the characteristics of tensile strength and resistance to stretch For instance, the jacket material may be selected such that the modulus of elasticity (Young's modulus) for the material is less than 1 GPa at room temperature and may be less than 400 MPa. Further, according to one application, the modulus of elasticity is less than 300 MPa at room temperature.

Since the stretch resistant element 20 is normally embedded within the jacket, characteristics such as coefficient of friction and deformability are less significant when selecting a material to be used for the stretch reduction element. Instead, properties such as axial strength and resistance to elongation are primary characteristics of the material selected for the stretch resistant element 20. Specifically, in the present instance, the material used for the stretch reduction element is selected based on the ability of the material to substantially impede elongation under load. Accordingly, the material for the stretch reducing element is selected such that the modulus of elasticity (Young's modulus) is greater than 1 GPa, and may be greater than 10 GPa. Further according to one application, the material is selected such that the modulus of elasticity is greater than 40 GPa. Although the stretch reduction element may be formed from a variety of materials, exemplary materials include polyester, nylon, aromatic polyester, and aromatic polyamide. Additionally, the stretch reduction element may be configured in any of a variety of forms, such as fibers or strands, or it may be a woven material, such as a fabric.

In the following discussion, the material for the stretch reduction element will be referred to as fibers. However, as discussed above, the process is not limited to using fiber.

As described above, the fibers 20 are formed from material having a relatively high modulus of elasticity. In this way, when the fibers are incorporated into the belt, the fibers reduce the tendency of the belt to stretch under load. Additionally, it has been found that the overall tendency of the belt to stretch is reduced if the fibers 20 are processed before being incorporated into the belt.

The fibers 20 are processed by exposing the fibers to an atmosphere of two reactive fluids to modify the surface of the fibers. Specifically, the fibers are exposed to an oxidizing environment in the presence of a second reactive fluid. In the present instance, the second reactive fluid is elemental fluorine. For instance, the fibers may be exposed to a bath of a mixture of fluorine gas and oxygen. The process may occur in a closed environment such as a reactor or other enclosure.

The fibers are exposed to the fluorine and oxygen mixture for a sufficient amount of time to modify the surface of the fibers, but preferably not long enough to modify the internal material of the fibers. In other words, although the entire length of the fiber is modified by the process, the fibers are exposed to the fluorine and oxygen mixture for a length of time sufficient to simply modify the surface layer of the fibers. At least a majority of the fiber material is not modified by the fluorine and oxygen mixture, and in the present instance, the modified surface amount to a substantially small amount of the overall volume of the fiber, such as less than 1%.

After the fibers are modified, the belt is formed. The belt may be formed using a variety of techniques. In the present instance, the jacket material is extruded with the fibers embedded within the jacket. Specifically, the jacket material is co-extruded with the fibers so that the jacket surrounds the fibers.

The extrusion process creates a length of belt material that is used to form a belt. The length of belt has a first end and a second end. The fibers extend through the length of the belt so that the first ends of the fibers are adjacent the first end of the length of belt, and the second ends of the fibers are adjacent the second end of the length of belt.

The length of belt material is formed into a continuous belt by connecting the first end of the belt material to the second end of the belt material. In this way, a loop is formed in which the fibers are continuous along substantially the entire length of the belt, with the first ends of the fibers being disposed adjacent the second ends of the fibers.

The ends of the belt may be connected in a variety of ways. In the present instance, the ends of the belt are welded together. Any of a variety of welds can be used, such as a scarf weld or a butt weld. Further, a more intricate weld joint may be used, such as one in which a portion of the jacket is stripped from each end so that a surface of the fibers are exposed on each end. The ends are then overlapped so that the ends of the fibers overlap, and the belt is then welded by heating the jacket material at the joint. The ends of the jacket material are then squeezed together under pressure to encourage ends of the jacket to flow together to form a weld joint. Alternatively, rather than using a weld, a mechanical fastener may be used to connect the ends of the belt.

Although any of a variety of connections can be utilized, in the present instance, the ends of the belt are butt welded by using sufficient heat applied to the ends of the jacket, and then applying sufficient pressure to the ends to force the ends to flow together to form a weld joint. Any excess jacket material is then trimmed away so that the profile of the belt at the weld is similar to the profile of the belt along substantially the remainder of the belt.

EXAMPLE

Samples of belts made according to the foregoing process were tested to evaluate the effect of modifying the stretch reduction element. In the test, the jacket material is formed of polyurethane and the stretch reduction element is formed of polyester fibers. The fibers were exposed to fluorine gas in an oxidizing atmosphere. After the fibers were treated, the fibers were co-extruded with the polyurethane jacket to produce a length of belt material of about 65" having the fibers embedded within the jacket. The belt material was joined together using a butt weld to form a continuous belt.

The belt was then mounted onto a pair of 6" diameter pulleys. An end load of 200 lbs was applied to the set up. The belt was run at approximately 1000 rpm, which is approximately 1674 ft/min. A torque of approximately 54 in-lbs was applied to the set-up. The resulting theoretical tension ration for the test was 1.2

During the test, the belt was run continuously for a 24 hour period under the test conditions described above. During the test the percentage of belt stretch was measured at different intervals.

The test was repeated on two control belts that incorporated untreated fibers. In other words, the fibers in the control belts were polyester fibers that had not been treated by exposure to fluorine gas in an oxidizing atmosphere. The remaining characteristics of the control belts were similar to the belts described above. Specifically, the control belts were made from the same type of polyurethane jacket. The belts had a 20 mm circular profile, and the reinforcing fibers were polyester.

Figure 3:
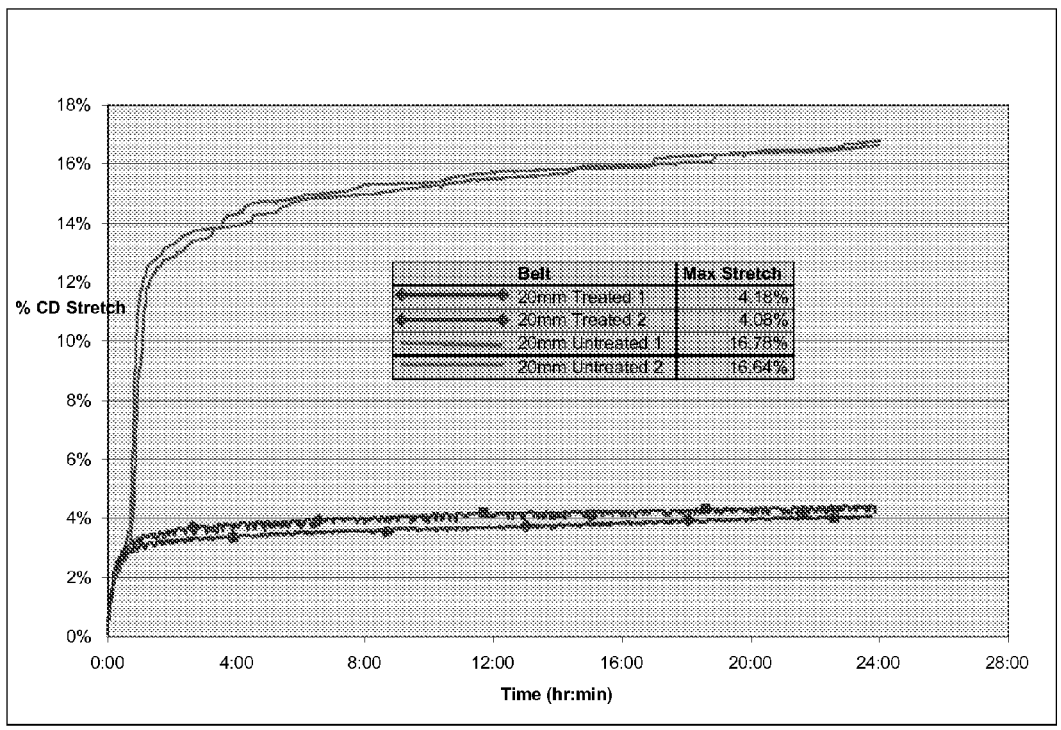
FIG. 3 is a chart illustrating the results of belt stretch test performed on belt made according to the present invention.

The results of the test for two similarly prepared test belts and two similarly prepared control belts are illustrated in FIG. 3. As can be seen in FIG. 3, the stretch for the belts incorporating the treated fibers was reduced approximately 75%. In other tests with different materials, the belt stretch was reduced approximately 50% or more.

It will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A method for improving the stretch-resistance of an endless belt, comprising the steps of:
   providing a thermoplastic jacket material having a modulus of elasticity, wherein the jacket material is polyurethane or polyester elastomer or polyether block amide;
   providing an elongated stretch reduction element having a modulus of elasticity that is greater than the modulus of elasticity of the jacket material;
   exposing the stretch reduction element to a bath of a reactive fluid in an oxidizing atmosphere for a time sufficient to provide an at least 25 percent reduction of the tendency of the belt to stretch under a predetermined tensile load as compared with a belt formed from the same jacket material and from a length of the stretch reduction element that is not exposed to a bath of reactive fluid in an oxidizing atmosphere;
   forming the jacket material into a belt jacket around the stretch reduction element to form a length of belt material having a first end and a second end; and
   connecting the first end to the second end to create a continuous belt; and wherein the step of exposing the stretch reduction element precedes the step of forming the jacket material into a belt jacket around the stretch reduction element.

2. The method of claim 1 wherein the step of exposing the stretch reduction element comprises exposing the stretch reduction element to a bath of reactive fluid in an oxidizing atmosphere for a time sufficient to alter the surface of the stretch reduction element to provide an at least 50 percent reduction of the tendency of the belt to stretch under a predetermined tensile load as compared with a belt formed from the same jacket material and from a length of the stretch reduction element that is not exposed to a bath of reactive fluid in an oxidizing atmosphere.

3. The method of claim 1 wherein the stretch reduction element has a first end and a second end, wherein the step of connecting comprises connecting the first and second ends of the belt material such that the first end of the stretch reduction element is adjacent the second end of the stretch reduction element.

4. The method of claim 1 wherein the step of connecting the first end to the second end comprises overlapping a first end of the stretch reduction element with a second end of the stretch reduction element.

5. The method of claim 1 comprising the step of mounting the continuous belt on a pair of spaced apart pulleys such that the belt is under a tensile load.

6. The method of claim 5 comprising the steps of loading an item onto the belt and rotating the pulleys to convey the item.

7. The method of claim 1 wherein the reactive fluid is a gas.

8. The method of claim 7 wherein the reactive gas is fluorine.

9. The method of claim 1 wherein the step of forming the jacket material comprises extruding the jacket material around the stretch reduction element.

10. The method of claim 1 wherein the step of connecting the first end to the second end comprises welding the first end to the second end.

11. The method of claim 1 wherein the stretch reduction element comprises a plurality of strands.

12. The method of claim 1 wherein the stretch reduction element comprises one of polyester fibers, nylon fibers, aromatic polyester fibers, and aromatic polyamide fibers.

13. A method for improving the stretch-resistance of an endless belt, comprising the steps of:
   providing a jacket material of polyurethane or polyester elastomer or polyether block amide having a modulus of elasticity;
   providing an stretch reduction element having a modulus of elasticity that is greater than the modulus of elasticity of the jacket material;

exposing the stretch reduction element to fluorine gas in an oxidizing atmosphere to improve the stretch reduction properties of the stretch reduction element when it is subsequently combined with the jacket material, wherein the step of exposing is performed for a time sufficient to provide an at least 25 percent reduction of the tendency of the belt to stretch under a predetermined tensile load as compared with a belt formed from the same jacket material and from a length of the stretch reduction element that is not exposed to a bath of reactive fluid in an oxidizing atmosphere;

forming the jacket material into a belt jacket around the stretch reduction element to form a length of belt material having a first end and a second end;

connecting the first end to the second end to create a continuous belt;

mounting the continuous belt between two pulleys;

applying a tensile force to the belt on the pulleys; and rotating the pulleys; and wherein the step of exposing the stretch reduction element precedes the step of forming the jacket material into a belt jacket around the stretch reduction element.

14. The method of claim 13 wherein the step of exposing the stretch reduction element comprises exposing the stretch reduction element to a bath of fluorine gas in an oxidizing atmosphere for a time sufficient to alter the surface of the stretch reduction element to provide an at least 50 percent reduction of the tendency of the belt to stretch under a predetermined tensile load as compared with a belt formed from the same jacket material and from a length of the stretch reduction element that is not exposed to a bath of reactive fluid in an oxidizing atmosphere.

15. The method of claim 13 comprising the steps of loading an item onto the belt and rotating the pulleys to convey the item.

16. The method of claim 13 wherein the step of forming the jacket material comprises extruding the jacket material around the stretch reduction element.

17. The method of claim 13 wherein the step of connecting the first end to the second end comprises welding the first end to the second end.

18. The method of claim 13 wherein the stretch reduction element comprises a plurality of strands.

19. The method of claim 13 wherein the stretch reduction element comprises one of polyester fibers, nylon fibers, aromatic polyester fibers, and aromatic polyamide fibers.

* * * * *